Patented Dec. 8, 1931

1,835,746

UNITED STATES PATENT OFFICE

LOUIS BARTELSTONE, OF FLATBUSH, NEW YORK, ASSIGNOR, BY MESNE ASSIGNMENTS, TO ELBEE HOLDING CORPORATION, OF WILMINGTON, DELAWARE, A CORPORATION OF DELAWARE

CELLULOSE METHOD OF LAMINATING GLASS

No Drawing.   Application filed June 3, 1926.   Serial No. 113,580.

This application is a continuation in part of my earlier application Serial No. 729,069, filed on July 30, 1924 and patented on December 14, 1926, No. 1,611,139, and the subject-matter of the present application is predicated upon the fundamental discoveries disclosed and claimed in that previous application, but it presents, among other improvements, a different procedure for conditioning the surfaces of the glass preliminary to pursuing the operation of cementing the panes of glass to celluloid in sheet form.

To obtain the highest degree of adhesion, the glass surfaces and preferably also those of the celluloid should be conditioned so that the agent which brings about the ultimate adhesion (in this case castor oil) may operate to the best advantage. The previous handling of the sheets of glass and of the sheets of celluloid, and the exposure of their surfaces to the air, tends to render those surfaces more or less unsuitable for the final cementing operation, either as a result of the deposit of invisible amounts of foreign matter such as dust, or oil or perspiration from the hands, or perhaps on account of some minute chemical action promoted by the atmosphere.

As a result of many experiments involving tests which necessarily require a long duration of time to develop tendencies in the direction of deterioration under conditions of usage, I have been able to demonstrate that the surfaces may best be brought into a condition best amenable to cementation by means of a semi-chemical treatment in the nature of a preliminary deposition of very thin films produced in situ by the evaporation of suitable liquids.

In my above mentioned application, I pointed out that good results could be obtained by first coating the glass "preferably with a microscopic film of celluloid". One advantage of utilizing celluloid was that its liquid solution was cheaper than other even more effective materials owing to the fact that the scraps accumulating from trimming the sheets of celluloid, and which would otherwise be wasted, could be dissolved in suitable solvents to make the conditioning solution. But, apart from that economy, I have, by long-duration tests, found that an agent free from camphor (the distinguishing element of celluloid) would, when appropriately brought into solution, act most efficiently to condition the surface of the glass, and my experiments conducted through a long period of time have revealed a way of obtaining extremely satisfactory results by utilizing an agent in the nature of a solution of a cellulose compound, such as cellulose nitrate or cellulose acetate.

The freedom of this agent from camphor appears to promote longevity of adhesion because camphor itself has no adhesive properties and is of a volatile nature; so much so that camphor left standing in the open air will very slowly lose weight by spontaneous evaporation, and even when most intimately combined, such camphor will evaporate but a long duration of time is required to render the effect of that action appreciable. My observations have indicated that the longevity of adhesion will be shortened unless the cementing agents are amendable, during the laminating process, to a sufficient elimination of volatile constituents so that, in the running of time, they may not operate to impair the adhesion. A camphor-like substance, being an essential constituent of all species of celluloid, cannot be eliminated without transforming the celluloid, and cannot quickly be decreased in proportions; whereas, by employing a conditioning agent initially devoid of slowly-volatile camphor-like substances, any ultimate effect of the camphor may be entirely obviated.

It is also apprehended that the employing of a camphor-free agent for initially conditioning the glass surface has a beneficial effect in preventing any of the volatile camphor, contained in the relatively thick sheet of laminating celluloid, from gradually permeating into actual contact with the glass itself, and this may explain the remarkable longevity of laminated glass as composed and made as herein disclosed.

A suitable camphor-free conditioning agent for the glass surface may assume the form of any commercial lacquer having a viscosity of about 125 drops per minute from a pipette (if composed of a solution of pure, or substantially pure, cellulose) will be suitable; providing appropriate solvents have been employed. Where the base consists of cellulose nitrate, such solvents are, for example, acetone, and/or a di-acetone and/or wood alcohol in addition to heavy but yet readily volatile alcohol such as butyl-alcohol or amyl-acetate preferably employed in combination rather than solely or individually. The solution may best be made by first employing the lighter or more volatile solvents for initially "cutting" or dissolving the shreds of cellulose nitrate, and the heavier solvents are then added in sufficient quantities to inhibit a "blush" when the lacquer is subsequently dried, but the heavier solvents should not be added in sufficient quantities to result in an unduly retarded drying of the lacquer.

A specific example coming within this prescription, and which I have found to give excellent results, is in the general proportion of about 12 ounces of shredded or comminuted cellulose nitrate dissolved in a mixture of about one-third of a gallon of acetone and about one-third of a gallon of wood alcohol; about one-third gallon of amyl-acetate being subsequently added after the dissolution has been effected. This will make a camphor-free lacquer well suitable for conditioning the surface of the glass if sprayed on that surface lightly and converted into a very thin solid film by carefully drying to expel the volatile solvents.

To condition the surface of the sheet of celluloid which is to be laminated between two sheets of glass, my experiments have revealed that it will suffice to use a solution of celluloid dissolved in any of the well known celluloid solvents such as acetone and amyl-acetate. That solution is sprayed lightly over the surface of the sheet of celluloid and, upon its evaporation and drying to expel the acetone and amyl-acetate, it will leave the sheet of celluloid with a virgin coat which thereafter must remain untouched by the hands so that the cementing fluid may without interference operate to effect the final adhesion.

Having conditioned the respective surfaces as above described, the further steps of the general process of the laminated problem may now be pursued. The conditioned surfaces are caused to adhere with molecular intimacy through the aid of uniting agency and this portion of the process is predicated upon the discovery that a non-solvent for the conditioned surface may be employed to great advantage and that an adhesion of an unprecedented strength and permanence may thereby be realized. Instead of using any of the conventional adhesives which would naturally suggest themselves to anyone undertaking to cement sheets together, I have found that a vegetable oil devoid of appreciable solvent properties towards celluloid or other material selected for the transparent intervening sheet may act under heat, pressure and time to bring about a union decidedly superior to those obtainable by the use of conventional adhesives. Castor oil is the species of vegetable oils which I have concluded to be most suitable; it being a vegetable product generally recognized as exhibiting no capacity for dissolving celluloid to any appreciable degree measured, of course, by the potency of conventional solvents for celluloid. The rôle of that oil does not appear to admit of any explanation within the present knowledge of the arts and sciences for it not only appears to possess inert qualities but, in the course of its employment, the effort is made to entirely squeeze it out from between the laminations of the element product. Whatever may be its molecular characteristics, I have at least demonstrated beyond question that through its agency an exceedingly tenacious and permanent adhesion may be readily accomplished through the aid of heat, pressure and a reasonable interval of time. From observations, I have been led to the belief that certain vegetable oils, and notably castor oil, while seemingly clear and limpid actually hold in colloidal suspension innumerable infinitely fine fibres derived probably when the oil is obtained by pressure from its vegetable source. I believe that an innumerable number of these infinitely small fibres remain between the sheets when the oil is squeezed out during the heating and pressing operation, and that these microscopic fibres each become bonds or coupling members and in their aggregate effect bring about the pronounced adhesion characterizing my product.

In using the castor oil, it is freely applied in generous excess to the respective surfaces to be coated and the glass and the celluloid sheets are then super-imposed and the surplus oil is permitted to escape by gravity into a collecting receptacle. The super-imposed sheets, which still contain an excess of castor oil are then transferred to the platen of the hydraulic or other powerful press; the clamping surface being so constructed that they, or at least one of them, may be maintained at any adjustable elevated temperature. During this heating and pressing operation, all of the castor oil, so far as can be perceived, is expelled from between the respective sheets and no traces of castor oil, so far as I have been able to observe, remain when the final adhesion is obtained, and yet it will be found that the parts are most tenaciously secured together and that they cannot be separated by the application of any force without either breaking or splitting the glass.

It has been discovered that castor oil operates so effectively in thus cementing glass and celluloid together that pressures and temperatures within considerable ranges may be resorted to with extremely efficient results for example, a temperature of from 200 degrees F. to 250 degrees F. under a pressure ranging from 100 pounds per square inch to 200 pounds per square inch will produce a distinctly superior adhesion; the time interval being from say 5 minutes to 10 minutes. It is believed that the best results can ordinarily be attained by employing a temperature of 220 degrees F. at a pressure of 100 pounds per square inch for the period of about 6 minutes for a three-ply ¼″ product.

In carrying out this process, especially with glass plates of considerable area, a refinement of great importance consists in the manner of applying the pressure. That is to say, the pressure should not be so applied as to seal marginal portions of the laminated glass before the castor oil has been completely expelled from central regions. Otherwise, the adhesion of the central regions would not attain the highest degree of tenacity. Therefore, this process contemplates the application of the pressure in such a manner that it becomes effective in the first instance on the central region of the laminated glass and progressively increases in magnitude from that inner portion outwardly so as progressively to squeeze every excess of the cementing material outwardly away from the central region until ultimately it is all expelled at the marginal portions before the ultimate pressure is applied to such marginal portions to produce the final permanent adhesion thereof. This progressive increase in the pressure until the entire product is subjected uniformly to the ultimate pressure may, of course, be accomplished by various structural characteristics of the press such as that of my Patent No. 1,334,588, March 23rd, 1920, and these structural characteristics relate to mechanical matters and form no part of this process but are subject to independent applications for structural patents.

In lieu of celluloid, sheets of cellulose acetate may be employed as the intervening non-shatterable foundation for the plates of glass. This acetate film may be affixed to the glass in precisely the same manner disclosed with respect to the celluloid and the glass may be initially prepared by simply cleansing as above described; it being found that a superior adhesion can be obtained in either instance and the resultant product will be found to possess an extremely high degree of clearness inasmuch as cellulose acetate can be obtained which will to no perceptible extent tend to exhibit an off-color tint as a result of prolonged exposure to sunlight.

It is contemplated that other elements equivalent to castor oil may be employed. For example, another oil of vegetable origin lacking in solvent properties toward cellu-loid or cellulose acetate is raw linseed oil and experiments have confirmed that this material may also be employed as above indicated for producing a very efficacious adhesion. Other analogous oils, which chemists will recognize as equivalents for castor oil and linseed oil, are likewise contemplated, especially such vegetable oils as these which have been obtained by the application of pressure to the vegetable material in which they have their origins, rather than by the use of chemical extractions or dissolutions.

From the foregoing, it will be understood that intervening sheets of celluloid or of cellulose compounds, as of cellulose acetate, may be efficaciously laminated to glass; a distinguished characteristic of this process of its product being that no camphor or camphor substitutes of a slowly volatile nature are brought into immediate contact with the glass surface which, being of an inorganic nature, is non-absorbent to camphor or its equivalent. A camphor-free film initially applied to the surface of the glass is very thin when thoroughly dried, being of a thickness approximating a 1/1000 of an inch, and yet this film is sufficient to prevent any appreciable amount of camphor from reaching the glass even if a celluloid sheet of substantial thickness be employed as one of the major laminating elements.

Having thus revealed this invention, I claim as new and desire to secure the following combinations and elements, or equivalents thereof, by Letters Patent of the United States:—

1. An article of manufacture comprising two panes of glass; an intervening sheet of celluloid; and intermediate transparent films of a camphor-devoid compound of cellulose, said films being in immediate contact with the inner glass surfaces.

2. A process of conditioning a surface of glass for subsequently cementing it to a surface of celluloid, said process comprehending the deposition on said glass surface of a thin liquid film of a cellulose solution free from camphor and then converting said liquid film into a solid film free from volatile matter.

3. An article in the nature of laminated glass comprising external panes of glass; an intervening sheet of flexible transparent material; and a solid film of cellulose nitrate intermediate each of the contiguous surfaces, said film of solid cellulose nitrate being deposited directly upon the glass surface and being cemented to the contiguous surface of the flexible sheet.

4. An article of manufacture comprising two panes of glass; an intervening sheet of flexible transparent material; and intermediate films of a compound of cellulose and an acid radical, said films being transparent and free from volatile matter and in immediate contact with the inner glass surfaces.

5. A process of conditioning a surface of glass for subsequently cementing it to a surface of an organic flexible sheet, said process comprehending the step of coating said glass surface with a thin liquid film of a solution of a cellulose compound, and then evaporating all solvent and volatile matter from said liquid film to convert it into a solid film.

6. An article in the nature of laminated glass comprising external panes of glass; an intervening sheet of celluloid; and a film of cellulose nitrate free from camphor intermediate each of the contiguous surfaces, said film of cellulose nitrate being deposited directly upon the glass surface and cemented to the contiguous surface of the flexible sheet.

7. An article of manufacture comprising two panes of glass, an intervening sheet of celluloid surfaced by an evaporated film of celluloid; and intermediate films of celluose nitrate free from volatile matter, said films being in immediate contact with the inner glass surfaces.

8. An article of manufacture comprising two panes of glass; an intervening flexible sheet of substantial thickness composed of a compound of cellulose; and intermediate transparent films of a thickness approximating a 1/1000 of an inch and composed of a compound of cellulose free of camphor-like material, said films being in immediate contact with the inner glass surface.

9. A process of conditioning a surface of glass to render it adapted to be cemented to a flexible sheet of a cellulose compound, said process comprehending the application to said glass surface of a film of a cellulose solution free from camphor-like ingredients and of such thickness that when subsequently dried into a solid form it will yield a film free from volatile matter and having a thickness approximating a 1/1000 of an inch.

10. A process of laminating glass consisting of first conditioning the inner surface of the glass by initially filming it with a solution of cellulose free from camphor; then evaporating the solvents to produce a solid film; and then through the agency of a vegetable oil derived by pressure from its source causing said prepared surface to adhere to an intervening flexible transparent sheet through the aid of heat and pressure.

In witness whereof, I have hereunto subscribed my name.

LOUIS BARTELSTONE.